United States Patent [19]

Ueno et al.

[11] 4,306,046
[45] Dec. 15, 1981

[54] METHOD FOR POLYMERIZING ETHYLENE BY MEANS OF A NOVEL TITANIUM CONTAINING CATALYST

[75] Inventors: Haruo Ueno, Chiba; Takefumi Yano, Ichihara; Michimasa Shimizu, Ichihara; Masanori Tamura, Ichihara; Sakae Yuasa, Ichihara, all of Japan

[73] Assignee: Ube Industries, Ltd., Chiba, Japan

[21] Appl. No.: 196,095

[22] Filed: Oct. 10, 1980

[30] Foreign Application Priority Data

Oct. 11, 1979 [JP] Japan .................................. 54-129983

[51] Int. Cl.³ ........................... C08F 4/02; C08F 10/02
[52] U.S. Cl. ................................. 526/128; 252/429 B; 526/348.6; 526/352; 526/352.2
[58] Field of Search .......................................... 526/128

[56] References Cited

U.S. PATENT DOCUMENTS 3,989,878 11/1976 Aishima et al. ...................... 526/128
4,105,847 8/1978 Ito et al. ............................... 526/128

Primary Examiner—Stanford M. Levin
Attorney, Agent, or Firm—Burgess, Ryan and Wayne

[57] ABSTRACT

An ethylene polymer is produced with an excellent yield by bringing a feed containing ethylene into contact with a catalyst which comprises (A) a solid catalytic ingredient prepared (a) by reacting a Grignard compound with an aluminium halide-tetraalkoxysilane reaction product and (b) bringing the resultant reaction product into contact with titanium tetrahalide and; (B) another catalytic ingredient consisting of a trialkyl aluminium.

15 Claims, No Drawings

METHOD FOR POLYMERIZING ETHYLENE BY MEANS OF A NOVEL TITANIUM CONTAINING CATALYST

FIELD OF THE INVENTION

The present invention relates to a method for polymerizing ethylene. More particularly, the present invention relates to a method for polymerizing a feed containing ethylene in the presence of a new type of catalyst.

BACKGROUND OF THE INVENTION

It is known that a polymerization of ethylene can be effected by using a highly active catalyst composed of a solid catalytic ingredient in which a titanium tetrahalide is carried on a magnesium compound and another ingredient which consists of an organic aluminum compound. With respect to the above-mentioned polymerization, various approaches have been attempted to provide a new method which is effective for increasing the yield of the resultant polymer per unit weight of the solid catalytic ingredient in the catalyst used, to such an extent that the resultant polymer contains a very small content of the used catalyst therein and, therefore, an operation for removing the used catalyst from the resultant polymer can be omitted.

For example, Japanese Patent Application Laid-open No. 53-78287 (1978) discloses that ethylene can be polymerized by using a catalyst composed of a solid catalytic component which has been prepared by reacting a magnesium alcoholate with a reaction product of an aluminum halide with a tetraalkoxysilane, and by bringing the resultant solid product into contact with titanium tetrahalide, and another catalytic component consisting of an organic aluminum compound. Also, the above-mentioned laid-open application discloses that the pressure of ethylene in the polymerization procedure is adjusted to 10 kg/cm$^2$, the yield of polyethylene is about 25,000 g per gram of the solid catalytic component and per hour of the polymerization time. However, in order to produce a polyethylene having a high degree of purity thereof so that the operation for removing the used catalyst from the resultant polymer is unnecessary, it is necessary to increase the yield of the polymer per gram of the used catalyst to more than the above-mentioned yield.

SUMMARY OF THE INVENTION

An object of the present invention is to provide a method for catalytically polymerizing ethylene to produce a polyethylene in an excellent yield per gram of the solid catalytic ingredient.

In other words, the object of the present invention is to provide a method for polymerizing ethylene by using such a very small amount of catalyst that it is not necessary to remove the used catalyst from the resultant polymer.

Another object of the present invention is to provide a method for polymerizing ethylene to produce a polyethylene having a large bulk density.

The above-mentioned objects can be attained by the method of the present invention which comprises bringing a feed containing ethylene into contact with a catalyst comprising (A) a solid catalytic ingredient which has been prepared in such a manner that (a) a Grignard compound is reacted with a reaction product of an aluminum halide with a tetraalkoxysilane and, then (b) the resultant solid reaction product is brought into contact with a titanium tetrahalide, and (B) another catalytic ingredient consisting of at least one trialkylaluminum.

DETAILED DESCRIPTION OF THE INVENTION

In the method of the present invention, it is essential that the polymerization of ethylene is carried out in the presence of a specific catalyst. In the specific catalyst, a solid catalytic ingredient is prepared in an atmosphere consisting of an inert gas, for example, nitrogen or argon gases, from a reaction product of an aluminum halide with a tetraalkoxysilane, a Grignard compound and a titanium tetrahalide, all of which contain substantially no water therein.

The aluminum halide is usually selected from the group consisting of aluminum chloride, aluminum bromide and aluminum iodide. The most useful aluminum halide is aluminum chloride.

The tetraalkoxysilane is usually selected from those of the formula, $Si(OR^1)_4$ wherein $R^1$ represents an alkyl radical having 1 to 8 carbon atoms. The tetraalkoxysilane is preferably selected from the group consisting of tetramethoxysilane, tetraethoxysilane, tetrapropoxysilane, tetrabutoxysilane and tetra-iso-amyloxysilane.

In the preparation of the reaction product of the aluminum halide and the tetraalkoxysilane, it is preferable that the aluminum halide is used in an amount of from 0.25 to 10 moles, more preferably, one mole, per mole of the tetraalkoxysilane. The reaction of the aluminum chloride with the tetraalkoxysilane is usually carried out by stirring a mixture of the aluminum chloride and a solution of the tetraalkoxysilane in an inert organic solvent, at a temperature of from −50° C. to 100° C. for 0.1 to two hours. The inert organic solvent comprises at least one compound selected from the group consisting of aliphatic and aromatic hydrocarbons, for instance, hexane, heptane, benzene and toluene, and halogenated aliphatic and aromatic hydrocarbons, for example, chlorobenzenes, dichlorohexanes and dichloroheptanes. This reaction is an exothermic reaction. The resultant reaction product is obtained in the form of a solution in the inert organic solvent. Usually, the reaction product is not isolated from the solution and the solution is used for the reaction with the Grignard compound.

The Grignard compound is preferably selected from those of the formula, $R^2MgX$ in which $R^2$ represents an alkyl radical having 1 to 8 carbon atoms and X represents a halogen atom. In the above-mentioned formula, it is preferable that X represents a chlorine atom. That is, the Grignard compound is preferably selected from methylmagnesium chloride, ethylmagnesium chloride, butylmagnesium chloride and hexylmagnesium chloride.

Also, it is preferable that the Grignard compound is used in an amount of from 0.05 to 4 moles, more preferably, about 2 moles, per mole of the tetraalkoxysilane which has been reacted with the aluminum halide.

The reaction of the Grignard compound with the aluminum halide-tetraalkoxysilane reaction product in Step (a) can be carried out in any of the conventional reaction methods. For example, it is preferable that the Grignard compound is used in the form of a solution thereof in an ether, or a mixture of the ether and an aromatic hydrocarbon. The solution of the Grignard compound is gradually added to a solution of the aluminum halide-tetraalkoxysilane reaction product in the inert organic solvent. The solution of the aluminum halide-tetraalkoxysilane reaction product may be gradually added to the solution of the Grignard compound.

The above-mentioned ether is preferably selected from those of the formula $R^3$-O-$R^4$, wherein $R^3$ and $R^4$ represent an alkyl radical having 2 to 8 carbon atoms, respectively. The preferable ethers are diethyl ether, di-isopropyl ether, di-n-butyl ether, and di-isoamyl ether.

The reaction of the Grignard compound with the aluminum halide-tetraalkoxysilane reaction product in Step (a) is usually carried out at a temperature of from $-50°$ to $100°$ C., preferably, from $-20°$ to $25°$ C., for a period of time sufficient for completing the reaction, usually, about 5 minutes or more. The reaction in Step (a) results in precipitation of a solid white reaction product from the reaction mixture.

The resultant solid reaction product in Step (a) is separated from the reaction mixture. The separated solid reaction product can be directly subjected to Step (b). However, it is preferable that the separated solid reaction product is washed with an organic solvent, for example, benzene, toluene, hexane and heptane.

In Step (b), the solid reaction product is brought into contact with a titanium tetrahalide, so as to allow at least a portion of the titanium used to be incorporated to the solid reaction product. The titanium tetrahalide to be used in Step (b) is preferably selected from titanium tetrachloride, titanium tetrabromide and titanium tetraiodide. The most preferable titanium tetrahalide is titanium tetrachloride. Also, in Step (b), it is preferable that the titanium tetrahalide is used in an amount of one mole or more, more preferably, from 2 to 100 moles, per mole of the Grignard compound used in Step (a). In Step (b), the contact of the solid reactant product with the titanium tetrahalide is carried out in the presence or absence of an inert organic solvent, for example, benzene, toluene, hexane and heptane, at a temperature of from $20°$ to $200°$ C., preferably, from $60°$ to $140°$ C., for a period of time sufficient for completing the contact, usually, from 0.5 to three hours.

After the contact is completed, the resultant titanium-containing solid product is separated from the contacting mixture by means of filtration or decantation. The separated product is washed with an inert organic solvent. The separated product contains 0.5 to 10% by weight of titanium.

The resultant solid catalytic ingredient is used concurrently with another catalytic ingredient consisting of at least one trialkylaluminum. The trialkylaluminum is preferably selected from those of the formula Al-$R_3^5$ in which $R^5$ represents an alkyl radical having 2 to 6 carbon atoms. The preferable trialkylaluminums for the present invention are triethylaluminum, tri-isobutylaluminum and tri-n-hexylaluminum. The most useful trialkylaluminums are triethylaluminum and tri-isobutylaluminum.

The trialkylaluminum is usually used in an amount of from 1 to 1,000 moles per gram atom of titanium contained in the solid catalytic ingredient.

The polymerization of the ethylene in accordance with the method of the present invention can be carried out either in a liquid phase or in a gaseous phase. In the case where the polymerization procedure is carried out in a liquid polymerization medium, the medium may be selected from aliphatic hydrocarbons, for example, n-butane, n-hexane and n-heptane; cycloaliphatic hydrocarbons, for example, cyclohexane and cyclopentane and; aromatic hydrocarbons, for example, benzene and toluene.

In the process of the present invention, the catalyst can be suspended in any concentration in the polymerization medium. Usually, the concentration of the catalyst is in a range of from 0.001 to 10 millimoles, in terms of element titanium contained in the catalyst, per liter of the polymerization medium, and in a range of from 0.001 to 1,000 millimoles, in terms of trialkylaluminum contained in the catalyst, per liter of the polymerization medium.

The method of the present invention is effective not only for polymerizing ethylene alone, but also, for co-polymerizing ethylene with at least one α-olefin having 3 or more carbon atoms, for example, propylene, 1-butene, 4-methyl-1-pentene and 1-hexene.

In the method of the present invention, the polymerization operation can be carried out in the same manner as that for the polymerization operation of the ethylene using a Ziegler type catalyst. That is, the polymerization is carried out in the absence of water and molecular oxygen. The polymerization temperature is usually in a range of from $30°$ to $100°$ C. and the polymerization pressure is usually in a range of from 1 to 80 kg/cm$^2$.

The method of the present invention can produce an ethylene polymer with a remarkably high degree of yield per unit weight of the solid catalytic ingredient contained in the catalyst used. Therefore, it is not necessary to remove the residual catalyst from the resultant polymer.

Also, the catalyst exhibits an excellent sensitivity to hydrogen which is used as a molecular weight regulating agent. Therefore, when the catalyst of the present invention is used, it is easy to regulate the molecular weight of the resultant polymer by using a small amount of hydrogen.

The specific examples presented hereinafter will serve to more fully explain how the present invention is practiced. However, it will be understood that these examples are only illustrative and in no way limit the scope of the present invention.

In the examples, the term "polymerization activity" used refers to a yield in grams of a resultant polymer per gram of a solid catalytic ingredient contained in a catalyst, per hour of polymerization time.

Also, the term "H.I." refers to a ratio in percent of the weight of a residue remaining after a polymer is extracted with boiling n-hexane for twenty hours, to the entire weight of the polymer.

Furthermore, the term "M.I." used in the examples refers to a melt flow index of a polymer which has been measured at a temperature of 190° C. under a load of 2.16 kg/cm$^2$ in accordance with ASTM D1238.

The preparation of a solid catalytic ingredient in each example, was carried out in a dry nitrogen atmosphere.

EXAMPLE 1

1. Preparation of Solid Catalytic Ingredient

A reaction product of aluminum chloride with tetra-ethoxysilane was prepared in such a manner that 15 millimoles of anhydrous aluminum chloride were dissolved in 40 ml of toluene, 15 millimoles of tetraethyoxysilane were added to the aluminum chloride solution and, then, the mixture was stirred at a temperature of 25° C. for one hour.

The resultant reaction mixture was cooled to a temperature of −10° C., and solution of 30 millimoles of n-butylmagnesium chloride in 25 ml of di-isoamyl ether was added dropwise to the cooled reaction mixture over 60 minutes while stirring the mixture. During this addition procedure, the temperature of the mixture was maintained in a range of from −10° to 0° C. After the dropwise addition was completed, the temperature of the mixture was maintained at −10° C. for one hour so as to continue the reaction. A solid product was precipitated from the reaction mixture. The solid product was filtered and washed with toluene and, then, with n-heptane.

The result of an elementary analysis of the resultant solid product is as follows.

Mg: 14.5% by weight, Al: 1.5% by weight, Si: 4.7% by weight, Cl: 43.8% by weight, —OC$_2$H$_5$: 20.1% by weight The resultant reaction product was suspended in 25 ml of toluene, and 150 millimoles of titanium tetrachloride were added to the suspension. The mixture was stirred at a temperature of 90° C. for one hour so as to allow the solid product to come into contact with titanium tetrachloride. The resultant titanium-containing solid product was filtered at 90° C., and washed with toluene and, then, with n-heptane.

2.8 g of the resultant titanium-containing solid catalytic ingredient were suspended in 50 ml of n-heptane. The solid catalytic ingredient contained 4.8% by weight of titanium.

2. Polymerization

The suspension containing 4.8 mg of the solid catalytic ingredient was placed in a glass ampoule and the ampoule was sealed. The ampoule was placed in a 1-liter autoclave with a stirrer, and, thereafter, the autoclave was closed and air in the autoclave was replaced by nitrogen gas.

The autoclave was charged with 600 ml of n-heptane and, then, with 1.3 ml of a solution of 0.48 millimoles of triethylaluminum in n-heptane.

Thereafter, the temperature of the content in the autoclave was elevated to 90° C. In this stage, the inner pressure of the autoclave was 0.2 kg/cm$^2$G.

The autoclave was charged with hydrogen gas until the entire pressure in the autoclave reached 1.4 kg/cm$^2$G and, then, together with ethylene until the entire pressures in the autoclave reached 11.4 kg/cm$^2$G (partial pressure of hydrogen: 1.2 kg/cm$^2$G, partial pressure of ethylene: 10.0 kg/cm$^2$G).

Five minutes after the completion of the introducing procedure of ethylene into the autoclave, a stirring procedure was applied to the contents in the autoclave so as to break the glass ampoule and to start the polymerization of ethylene. The polymerization procedure was continued at a temperature of 90° C. for one hour. During the polymerization procedure, an additional amount of ethylene was continuously introduced into the autoclave so as to maintain the entire pressure of the content in the autoclave at 11.4 kg/cm$^2$G.

After the polymerization was completed, non-reacted ethylene was exhausted from the autoclave, the broken glass ampoule was removed from the polymerization mixture. The polymerization product was removed from the autoclave and mixed with isopropyl alcohol so that the resultant mixture had a volume of 2 liters. The mixture was subjected to a filtration procedure to separate the resultant polymer from the mixture. The polymer was dried at a temperature of 50° C. for 20 hours under a reduced pressure.

255 g of white polyethylene powder was obtained. The polyethylene powder exhibited a bulk density of 0.36, H.I. of 99.5%, M.I. of 0.1 g/10 minutes and a density of 0.960 g/cm$^3$. The polymerization activity of the catalyst used was 53,700.

EXAMPLES 2 THROUGH 4

In each of the Examples 2 through 4, the same procedures as those mentioned in Example 1 were carried out, except that hydrogen gas was used in a partial pressure thereof as indicated in Table 1, and the partial pressure of ethylene in the autoclave was maintained at 10 kg/cm$^2$G.

The results of Examples 2 through 4 are indicated in Table 1, in comparison with the results of Example 1.

TABLE 1

| Example No. | Partial pressure of hydrogen (kg/cm$^2$G) | Polymerization activity | H.I. (%) | M.I. (g/10 minutes) |
|---|---|---|---|---|
| 1 | 1.2 | 53,700 | 99.5 | 0.1 |
| 2 | 0 | 49,000 | 99.6 | — |
| 3 | 0.6 | 51,000 | 99.7 | — |
| 4 | 2.4 | 52,000 | 99.7 | 0.5 |

EXAMPLES 5 THROUGH 7

In each of the Examples 5 through 7, the same procedures as those mentioned in Example 2 were carried out, except that the triethyl aluminum was used in an amount as indicated in Table 2.

The results are indicated in Table 2.

TABLE 2

| Example No. | Amount (m.moles) of triethyl aluminum | Polymerization activity | H.I. (%) |
|---|---|---|---|
| 5 | 0.24 | 46,300 | 99.6 |
| 6 | 0.96 | 48,000 | 99.5 |
| 7 | 1.44 | 43,100 | 99.7 |

EXAMPLE 8

The same procedures as those described in Example 2, were carried out, except that the triethyl aluminum was replaced by 0.48 millimoles of tri-isobutyl aluminum. The resultant polyethylene exhibited an H.I. of 99.7%. The polymerization activity was 49,900.

EXAMPLE 9

The same procedures as those described in Example 2 were carried out, except that the partial pressure of ethylene was changed to 6.8 kg/cm$^2$.

The resultant polyethylene had an H.I. of 99.7%. The polymerization activity was 32,100.

EXAMPLE 10

The same procedures for preparing a solid catalytic ingredient as those described in Example 1 were carried out, except that the tetraethoxysilane was replaced by 15 millimoles of tetraisoamyloxysilane. The resultant solid catalytic ingredient contained 4.5% by weight of titanium.

Next, the same polymerization procedures as those described in Example 1 were carried out, except that 4.8 mg of the above resultant catalytic ingredient were used.

The resltant polyethylene exhibited an H.I. of 99.6%. The polymerization activity was 62,000.

EXAMPLE 11

(1) Preparation of solid catalytic ingredient

A suspension of a solid catalytic ingredient was prepared in the same manner as described in Example 1.

(2) Polymerization

The suspension of 2.0 mg of the solid catalytic ingredient was placed in a glass ampoule and the ampoule was sealed. The ampoule was placed in an one-liter autoclave with a stirrer, and the autoclave was closed and air in the autoclave was replaced by nitrogen gas. 1.5 ml of a solution of 0.6 millimoles of triethyl aluminum in n-heptane was fed into the autoclave and, then, hydrogen gas was introduced into the autoclave until the pressure of the hydrogen gas reached 1 $kg/cm^2G$. Thereafter, 100 ml of butene-1 and, then, 500 ml of n-butane were introduced into the autoclave. The autoclave was shaken and heated so that the temperature of the content therein was elevated to 66° C. Thereafter, ethylene was introduced into the autoclave until the entire pressure of the autoclave reached 28 $kg/cm^2$ G.

Five minutes after the introducing procedure of ethylene was completed, a stirring procedure was applied to the content in the autoclave. The glass ampoule was broken and a copolymerization of ethylene with butene-1 was carried out at a temperature of 66° C. for one hour. During the polymerization procedure, an additional amount of ethylene was continuously introduced into the autoclave so as to maintain the entire pressure of the contents in the autoclave at 28 $kg/cm^2G$.

The resultant ethylene-butene-1 copolymer had a density of 0.926 $g/cm^3$. The polymerization activity was 52,500.

We claim:

1. A method for polymerizing ethylene which comprises bringing a feed containing ethylene into contact with a catalyst comprising (A) a solid catalytic ingredient formed by reacting (a) an aluminum halide with a tetraalkoxysilane of the formula $Si(OR^1)_4$ wherein $R^1$ is an alkyl radical having 1 to 8 carbon atoms, and the ratio of aluminum halide to tetraalkoxysilane is from 0.25:1 to 10:1; (b) reacting at a temperature of from −50° to 100° C., the reaction product of step (a) with a compound of the formula $R^2MgX$ wherein $R^2$ is an alkyl radical having 1–8 carbon atoms and X is a halogen atom wherein the $R^2MgX$ compound is used in a mole ratio of 0.05:1 to 4:1 per mole of the tetraalkoxysilane used in step (a) to form a solid reaction product; (c) contacting at a temperature of from about 20° C. to 200° C., the reaction product of step (b) with at least 1 mole of titanium tetrahalide per mole of the compound of the formula $R^2MgX$ used in step (b), and (B) a catalytic ingredient consisting essentially of at least one trialkyl aluminum compound.

2. A method as claimed in claim 1, wherein the contact of said feed with said catalyst is carried out at a temperature of from 30° to 100° C.

3. A method as claimed in claim 1, wherein the contact of said feed with said catalyst is effected under a pressure of from 1 to 80 $kg/cm^2$.

4. A method as claimed in claim 1, wherein said aluminum halide is selected from the group consisting of aluminum chloride, aluminum bromide and aluminum iodide.

5. A method as claimed in claim 1, wherein the solid reaction product is washed with an organic solvent consisting of at least one member selected from the group consisting of benzene, toluene, hexane and heptane.

6. A method as claimed in claim 1, wherein said titanium tetrahalide to be used is selected from titanium tetrachloride, titanium tetrabromide, and titanium tetraiodide.

7. A method as claimed in claim 1, wherein, said titanium tetrahalide is used in an amount of 2–100 mole per mole of said Grignard compound used.

8. A method as claimed in claim 1, wherein said solid catalytic ingredient contains 0.5 to 10% by weight of titanium.

9. A method as claimed in claim 1, wherein said trialkyl aluminum is selected from those of the formula, $AlR_3^5$, wherein $R^5$ represents an alkyl radical having 2 to 6 carbon atoms.

10. A method as claimed in claim 1, wherein said trialkyl aluminum is used in an amount of from 1 to 1000 moles per gram atom of titanium contained in said solid catalytic ingredient.

11. A method as claimed in claim 1, wherein said catalyst is suspended in a polymerization medium.

12. A method as claimed in claim 11, wherein said catalyst suspended in said polymerization medium is in an amount, in terms of elemental titanium, of 0.001 to 10 milligram atoms per liter of said polymerization medium.

13. A method as claimed in claim 11, wherein said catalyst suspended in said polymerization medium is in an amount, in terms of the trialkyl aluminum, of 0.001 to 1,000 millimoles per liter of said polymerization medium.

14. A method as claimed in claim 1, wherein said feed contains, in addition to ethylene, at least one α-olefin having 3 or more carbon atoms.

15. A method as claimed in claim 14, wherein said α-olefin is selected from the group consisting of propylene, 1-butene, 4-methyl-1-pentene and 1-hexene.

* * * * *